United States Patent
Bai

(10) Patent No.: US 9,940,556 B2
(45) Date of Patent: Apr. 10, 2018

(54) METHOD OF IMAGE PROCESSING THAT ENSURES EFFECTIVE RESOURCE DATA SEARCH

(71) Applicant: Kyocera Document Solutions Inc., Osaka (JP)

(72) Inventor: Xuqiang Bai, Rancho Palos Verdes, CA (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 15/253,859

(22) Filed: Aug. 31, 2016

(65) Prior Publication Data

US 2018/0060708 A1   Mar. 1, 2018

(51) Int. Cl.
G06K 15/02 (2006.01)
G06F 3/12 (2006.01)
G06F 17/30 (2006.01)

(52) U.S. Cl.
CPC ... G06K 15/1805 (2013.01); G06F 17/30876 (2013.01); G06F 17/30997 (2013.01); G06K 15/1813 (2013.01); G06K 15/1836 (2013.01)

(58) Field of Classification Search
None
See application file for complete search history.

(56) References Cited

U.S. PATENT DOCUMENTS

| | | | |
|---|---|---|---|
| 5,781,714 A * | 7/1998 | Collins | G06F 17/214 345/471 |
| 6,493,706 B1 * | 12/2002 | Mead | G06F 17/30961 |
| 7,533,138 B1 * | 5/2009 | Martin | G06F 9/466 |
| 8,804,161 B2 | 8/2014 | Omura | |
| 2004/0093604 A1 * | 5/2004 | Demsey | G06T 1/60 719/310 |
| 2005/0094172 A1 * | 5/2005 | Engelman | G06F 3/1204 358/1.11 |
| 2009/0161160 A1 | 6/2009 | Ozawa et al. | |
| 2009/0161971 A1 | 6/2009 | Nogawa et al. | |
| 2009/0254808 A1 * | 10/2009 | Yuan | G06F 17/2229 715/234 |
| 2012/0224208 A1 | 9/2012 | Tokumoto | |

(Continued)

FOREIGN PATENT DOCUMENTS

| | | |
|---|---|---|
| JP | 2008-234506 A | 10/2008 |
| JP | 2010-046890 A | 3/2010 |
| JP | 2010-046891 A | 3/2010 |

*Primary Examiner* — Beniyam Menberu
(74) *Attorney, Agent, or Firm* — James Judge

(57) ABSTRACT

A method of image processing includes: reading a data file in a predetermined page description language including a search key; chaining a plurality of pieces of resource data in each of a plurality of resource dictionaries; loading the chained plurality of pieces of resource data in each of the plurality of resource dictionaries in a memory area including unique keys; searching the requested resource data from the chained pieces of resource data using the search key for matching the unique key of the requested resource data one by one along the chain in both direction from a starting piece of resource data; labeling each of the plurality of pieces of resource data based on a history of the matching. The searching includes determining the starting piece of resource data in the chained plurality of pieces of resource data based on the history.

20 Claims, 13 Drawing Sheets

(56) References Cited

U.S. PATENT DOCUMENTS

| | | | | |
|---|---|---|---|---|
| 2012/0284295 A1* | 11/2012 | Wang | ................ | G06F 17/30457 707/769 |
| 2013/0080735 A1* | 3/2013 | Kimura | ............... | G06F 12/1027 711/207 |
| 2015/0234933 A1* | 8/2015 | Grover | .............. | G06F 17/30359 707/800 |

* cited by examiner

Comparative Example

Embodiment

State 1: Searching KeyX

State 2: KeyX found and Searching KeyY

State 3: KeyY not found and Searching KeyZ

State 4: KeyZ not found

METHOD OF IMAGE PROCESSING THAT ENSURES EFFECTIVE RESOURCE DATA SEARCH

BACKGROUND

Unless otherwise indicated herein, the description in this section is not prior art to the claims in this application and is not admitted to be prior art by inclusion in this section.

This disclosure is related with a rendering technique for XPS (trademark) print job in a printer RIP system. The XPS uses extensible markup language (XML) to describe paper layout and drawing commands. Resource dictionary is defined in XPS to contain drawing information shared by drawing commands. In many cases, the resource dictionary holds many resources. It takes time to find a resource from a resource dictionary that holds many resources. This disclosure is related with a fast resource searching technique in resource dictionary.

SUMMARY

A method of image processing according to one aspect of the disclosure includes: reading a data file in a predetermined page description language, the data file including a command configured to request a resource data to reproduce a page, the command including a search key; chaining a plurality of pieces of resource data in each of a plurality of resource dictionaries; loading the chained plurality of pieces of resource data in each of the plurality of resource dictionaries in a memory area, the chained plurality of pieces of resource data each including a unique key; searching the requested resource data from the chained pieces of resource data using the search key for matching the unique key of the requested resource data one by one along the chain in both direction from a starting piece of resource data; labeling each of the plurality of pieces of resource data based on a history of the matching. The searching includes determining the starting piece of resource data in the chained plurality of pieces of resource data based on the history.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
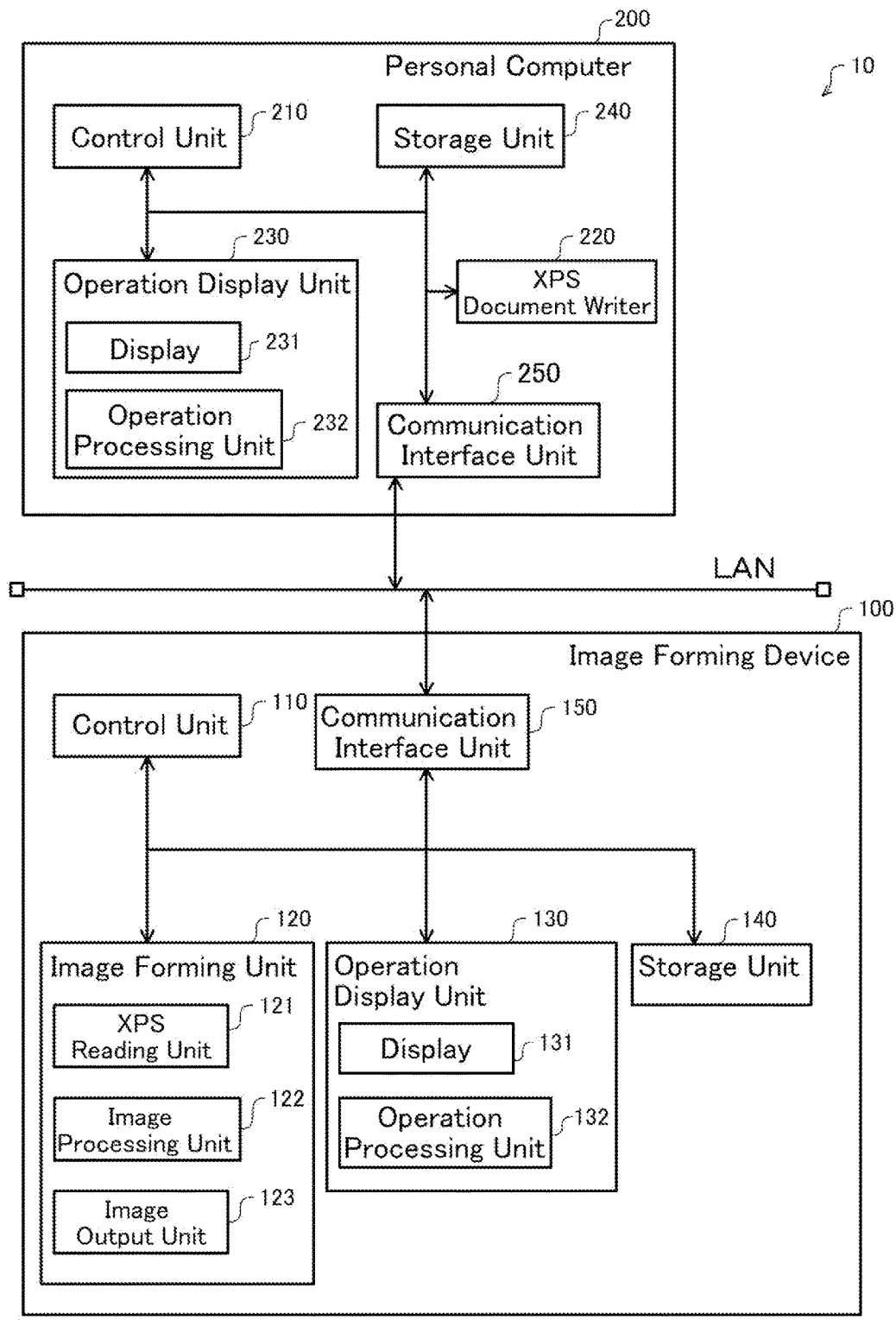
FIG. 1 illustrates a block diagram representing a functional configuration of an image forming system 10 according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes embodiments of the disclosure (hereinafter referred to as, the "embodiments") comparing with a comparative example with reference to the drawings.

FIG. 1 illustrates a block diagram representing a functional configuration of an image forming system 10 according to one embodiment of the disclosure. The image forming system 10 includes an image forming device 100 and a personal computer 200. The personal computer 200 is connected to the image forming device 100 via a network, which is a LAN in this example.

The image forming device 100 includes a control unit 110, an image forming unit 120, an operation display unit 130, a storage unit 140, and a communication interface unit 150. The personal computer 200 includes a control unit 210, an XPS document writer 220, an operation display unit 230, a storage unit 240, and a communication interface unit 250. The XPS document writer 220 is a print-to-file driver that enables a Windows (trademark) application to create XML Paper Specification (XPS) document files.

The communication interface unit 150 and the communication interface unit 250 communicate using a transmission control protocol/internet protocol (TCP/IP) suite. The communication interface unit 150 functions as a print data receiver in this embodiment. The print data receiver may receive print data via a discrete I/O interface.

The image forming unit 120 includes an XPS reading unit 121, an image processing unit 122, and an image output unit 123. The XPS reading unit 121 renders a XPS print job as a printer RIP system. The image processing unit 122 processes the rendered image data in accordance with a print setting. The image output unit 123 prints an image on a printing medium based on the rendered print data. The XPS reading unit 121 and the image processing unit 122 function as a monochrome data generating unit. The image output unit 123 functions as a print executing unit.

The XPS reading unit 121 reads the extensible markup language (XML) in the XPS print job to describe paper layout and drawing commands. The XPS reading unit 121 renders the XPS print job using drawing information, which is also called as resource, shared by the drawing commands.

The operation display unit 130 of the image forming device 100 includes a display 131 and an operation processing unit 132. The operation display unit 230 of the personal computer 200 includes a display 231 and an operation processing unit 232. The display 131, which functions as a touch panel, displays various menus as a receiving screen. The operation processing units 132 and 232 accept an input operation of a user from the display 131, which functions as a touch panel, and various kinds of buttons and switches (not illustrated).

The control units 110 and 210 include a main storage unit such as a RAM and a ROM, and a control unit such as a micro-processing unit (MPU) and a central processing unit (CPU). The control units 110 and 210 also include a controller function related to an interface such as various kinds of I/Os, a universal serial bus (USB), a bus, and other hardware, and control the entire image forming device 100 and the entire personal computer 200, respectively.

The storage units 140 and 240 are storage devices formed of such as a hard disk drive and a flash memory, which are non-transitory recording mediums, and store control programs and data of processes performed by the control units 110 and 210, respectively.

Figure 2:
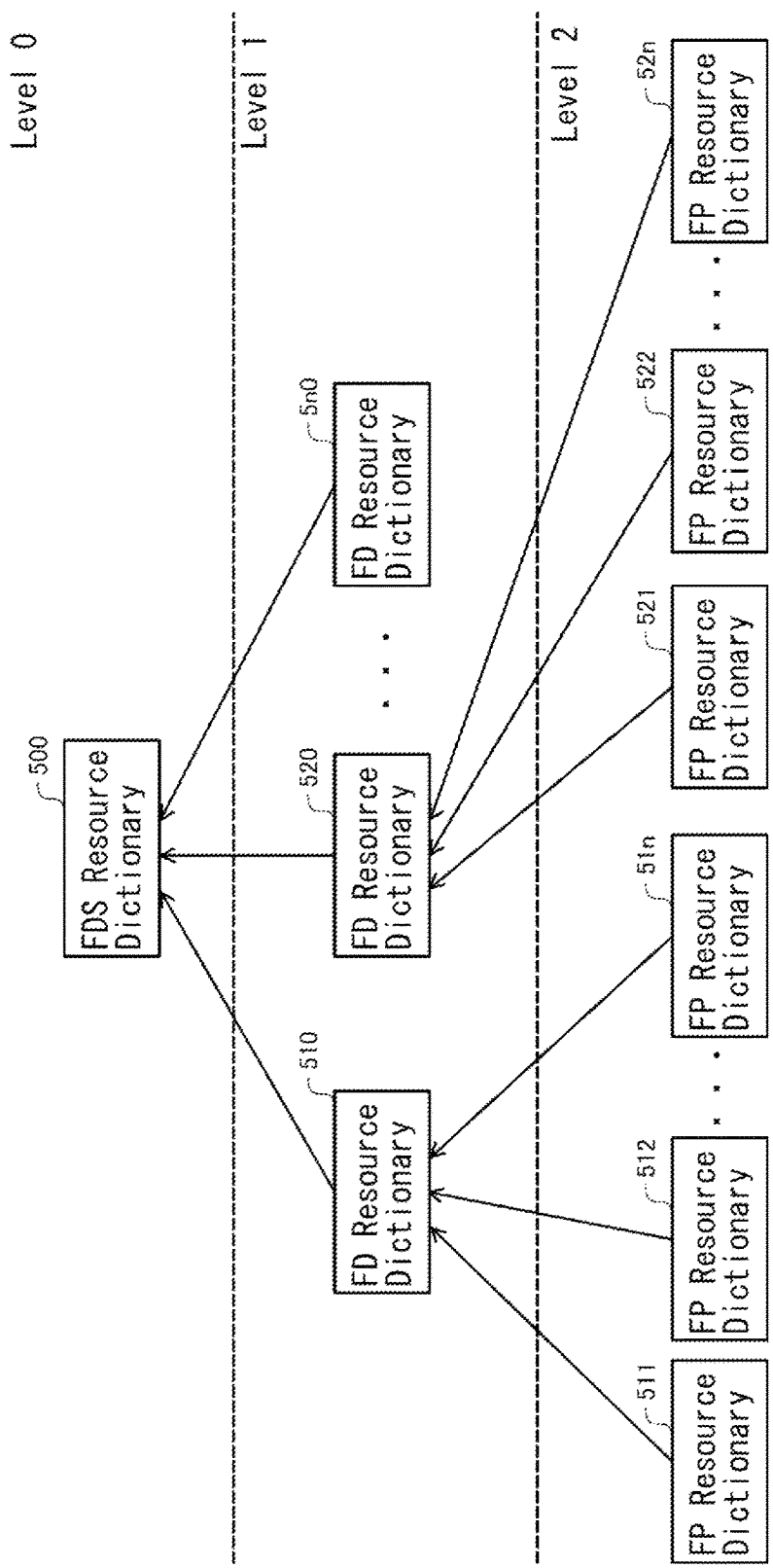
FIG. 2 illustrates a typical hierarchical structure of resource dictionaries in XPS.

FIG. 2 illustrates a typical hierarchical structure of resource dictionaries in XPS. The resources or drawing information are held in resource dictionaries in a package of the XPS print job or in the storage unit 140. The resource dictionaries are hierarchical structured in the XPS print job. The top level (level 0) is FixedDocumentSequence resource dictionary (also referred to as FDS resource dictionary), the second top level (level 1) is FixedDocument resource dictionary (also referred to as FD resource dictionary), the third top level (level 2) is FixedPage resource dictionary (also referred to as FP resource dictionary), and the fourth top level (level 3) is canvas resource dictionary, which is not shown. Also, the canvas can nest canvases. So there may be lower canvas resource dictionary under the canvas resource dictionary.

The FDS resource dictionary 500 is shared in the sequence of documents. The FD resource dictionary 510 is shared in each document of the sequence of documents. The FP resource dictionary 511 is shared in each page of the document. The FP resource dictionary 511 in the hierarchy of page is searchable from a corresponding page, the FD resource dictionary 510 in the hierarchy of document is searchable from a corresponding document, and the FDS resource dictionary 500 in the hierarchy of document sequence is searchable from a corresponding document sequence.

According to the XPS specification, the resource searching order is from the current dictionary to higher level resource dictionaries. For example, if the current dictionary is FP resource dictionary 511, the resource searching starts from FP resource dictionary 511. If the resource cannot be found in the FP resource dictionary 511, then another searching takes place in the FD resource dictionary 510. If the resource can't be found in the FD resource dictionary 510, then another searching takes place in the FDS resource dictionary 500.

Figure 3:
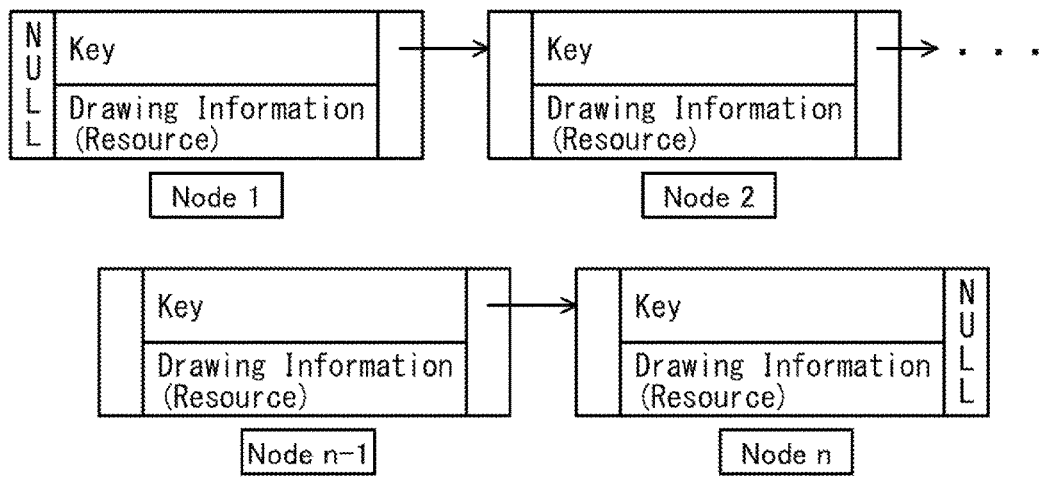
FIG. 3 illustrates a schematic drawing representing a typical resource searching process using a one-direction chain structure according to a comparative example.

FIG. 3 illustrates a schematic drawing representing a typical resource searching process using a one-direction chain structure according to a comparative example. The resource dictionaries each include a plurality of nodes each having a unique key and drawing information. The key is used for identifying the node to acquire the drawing information or resource. The starting node has null in one specific area while the end node has null in another specific area.

The typical resource searching process employs a conventional method. The conventional method organizes resources in each resource dictionary using a one-direction chain structure in a cache memory. Every searching starts from the starting node and ends until target resource is found or the end node of the resource chain is reached. The resource searching time is slow if there are many resources in a resource dictionary.

Figure 4:
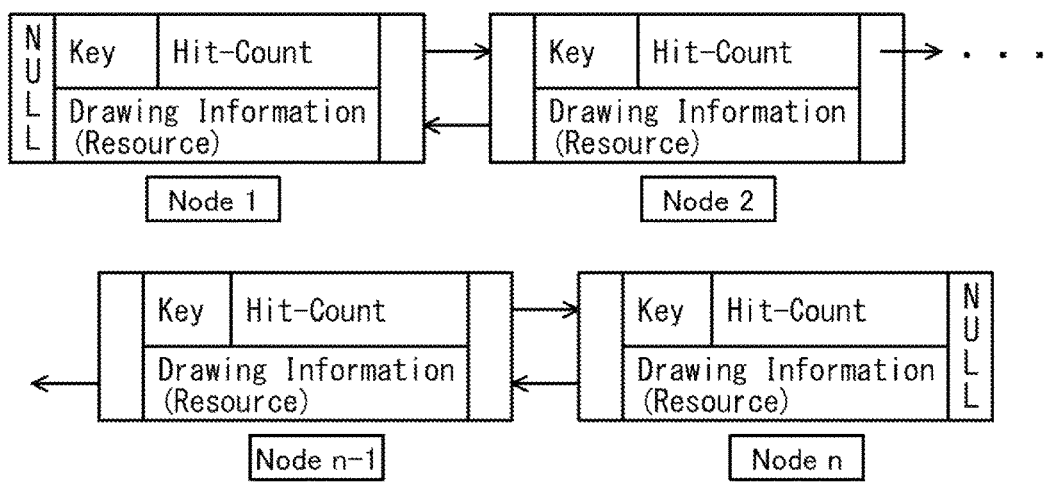
FIG. 4 illustrates a schematic drawing representing a resource searching process using a bi-direction chain structure according to one embodiment.

FIG. 4 illustrates a resource searching process using a bi-direction chain structure according to the one embodiment. This disclosure ensures an improved resource searching time using: a bi-direction chain structure in the cache memory and a hit count member in every node of the resource chain.

Figure 5:
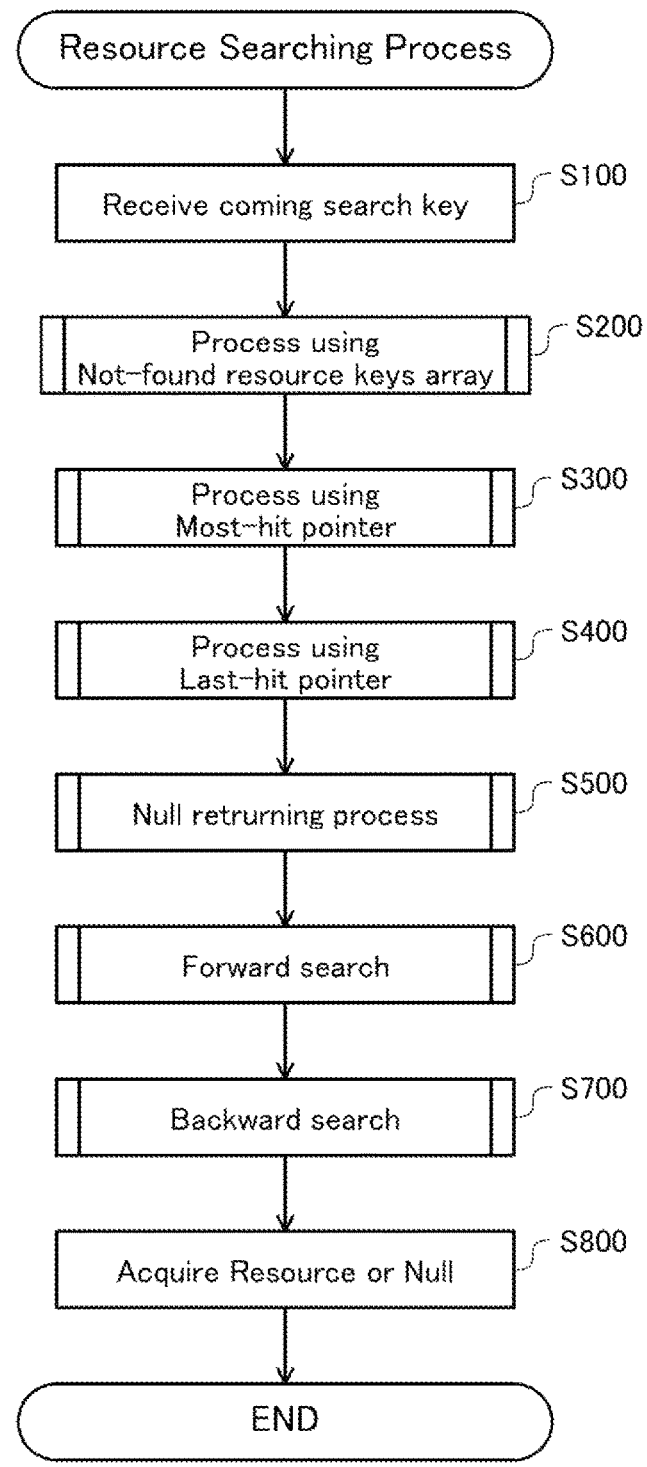
FIG. 5 illustrates a flow chart representing the resource searching process according to the one embodiment.

FIG. 5 illustrates a flow chart representing the resource searching process according to the one embodiment. The resource searching process is executed every time the XPS reading unit 121 reads a drawing command including a unique key for identifying the node with the specified drawing information or resource in the resource dictionary. At Step S100, the XPS reading unit 121 receives the unique key.

Figure 6:
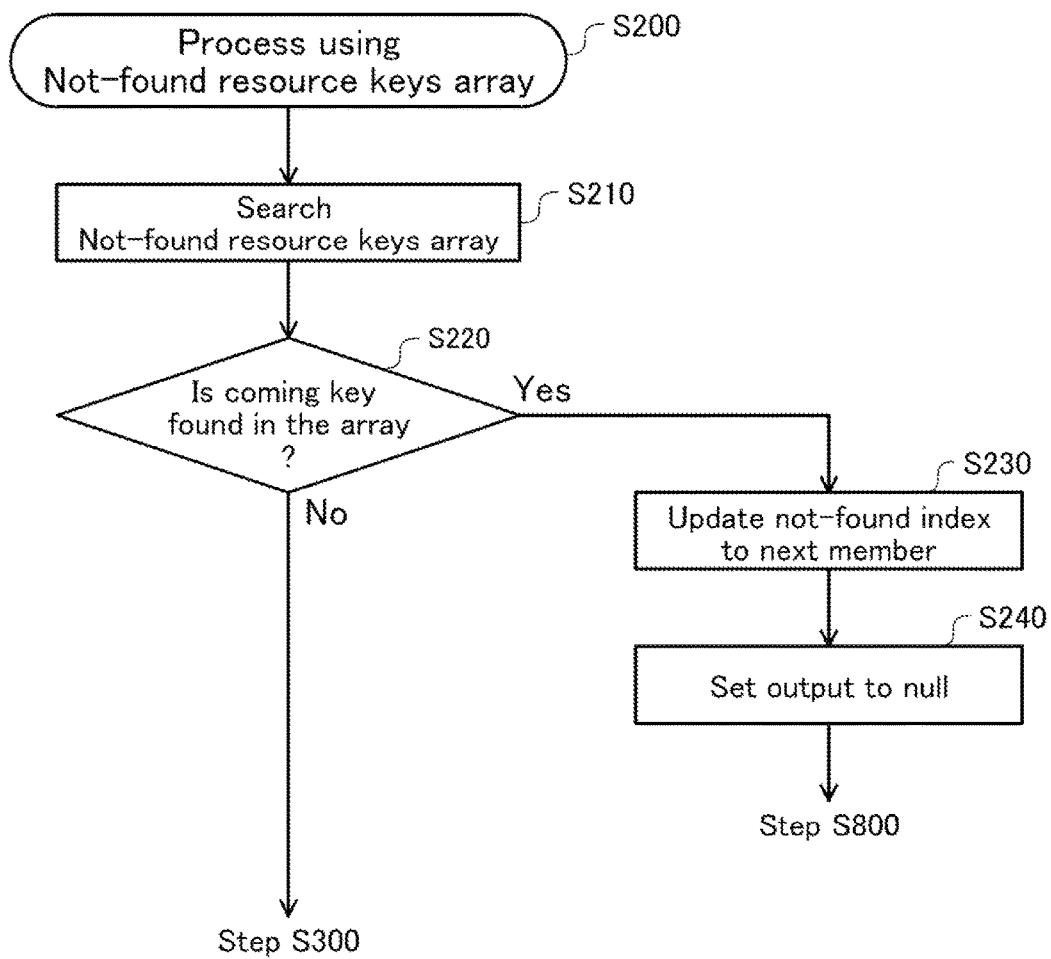
FIG. 6 illustrates a flow chart representing the resource searching process using a not-found resource keys array according to the one embodiment.
Figure 7:
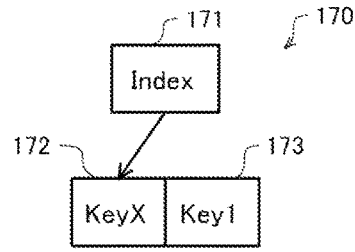
FIG. 7 illustrates a schematic drawing representing the not-found resource keys array in the bi-direction chain structure according to the one embodiment.
Figure 7:
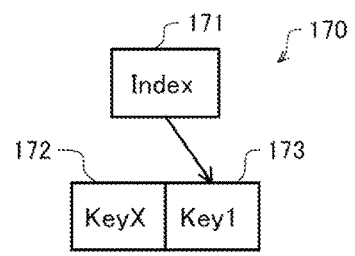
Figure 7:
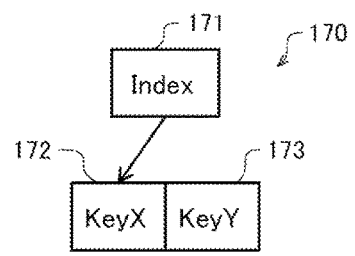
Figure 7:
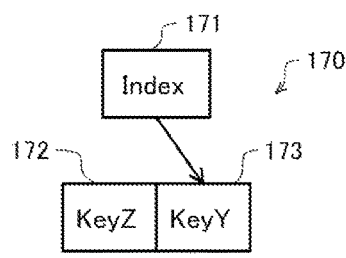

FIG. 6 illustrates a flow chart representing the resource searching process using a not-found resource keys array according to the one embodiment. FIG. 7 illustrates a schematic drawing representing the not-found resource keys array 170 in the bi-direction chain structure according to the one embodiment.

The XPS reading unit 121 creates the not-found resource keys array 170 if the resource dictionary has resources more than a predefined threshold value, such as 10, so as to ensure fast search. The not-found resource keys array 170 only holds a small number of resource keys, which is 2, in this embodiment. For example, a 2-member array 172 and 173, shown in FIG. 7, are created to hold not-found keys or none of the match for labeling the dictionary. In FIG. 7, the index for current position, which is also referred as "not-found index," of the array is initialized to KeyX by an index 171.

At Step S200, the XPS reading unit 121 executes the process using the not-found resource keys array 170. At Step S210, the XPS reading unit 121 searches the received key, which is KeyX in this example, in the not-found resource keys array 170. As shown in State 1 of FIG. 7, the 2-member array 172 and 173 of the not-found resource keys array 170 initially have KeyX and Key1, respectively.

At Step S220, the XPS reading unit 121 determines whether the KeyX is found in the 2-member array 172 and 173 or not. If the KeyX is found in the 2-member array 172 and 173, the XPS reading unit 121 advances the process to Step S230. If the KeyX is not found in the 2-member array 172 and 173, the XPS reading unit 121 advances the process to Step S300 (see FIG. 5). In this case, since the current member 172 has KeyX, the XPS reading unit 121 advances the process to Step S230.

At Step S230, the XPS reading unit 121 updates the not-found resource keys array 170. Specifically, the XPS reading unit 121 updates the index 171 to point the next member 173 including Key1 from the current member 172 including KeyX as shown in State 2 of FIG. 7.

If the XPS reading unit 121 receives KeyY after KeyX, and KeyY is not found in the resource dictionary, the XPS reading unit 121 inserts the received coming KeyY into the current member 173 and updates the index 171 to point the next member 172 from the current member 173 as shown in State 3 of FIG. 7. If the XPS reading unit 121 receives KeyZ after KeyY, and KeyZ is not found in the resource dictionary, the XPS reading unit 121 inserts the received coming KeyZ into the current member 172 and updates the index 171 to point the next member 173 from the current member 172 as shown in State 4 of FIG. 7.

At Step S240, the XPS reading unit 121 sets the output to null and proceeds to Step S800. Then, the XPS reading unit 121 searches the received key in another resource dictionary specified by the resource searching order in the hierarchical structure of resource dictionaries in FIG. 2. The not-found resource keys array 170 is reset whenever a new resource is added into the resource dictionary.

Figure 8:
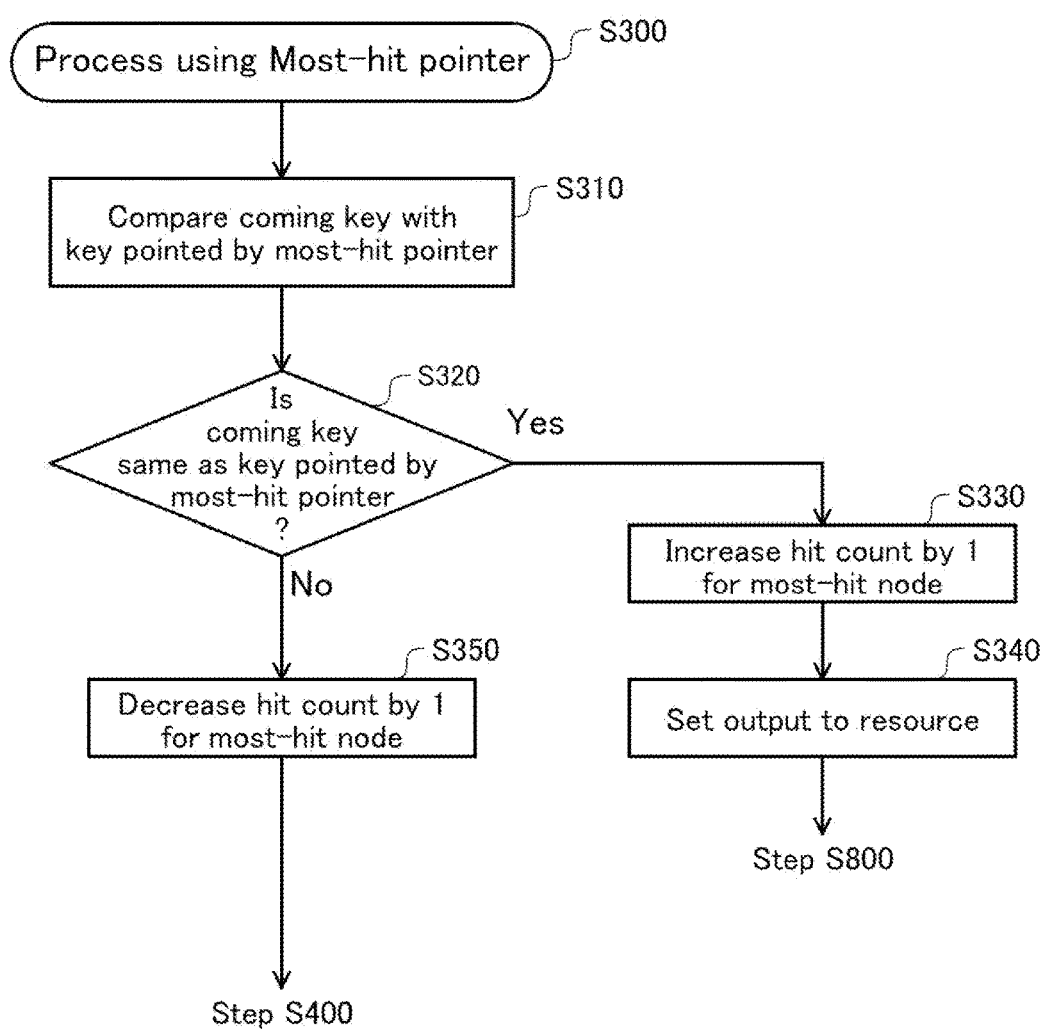
FIG. 8 illustrates a flow chart representing the resource searching process using a most-hit pointer according to the one embodiment.
Figure 9:
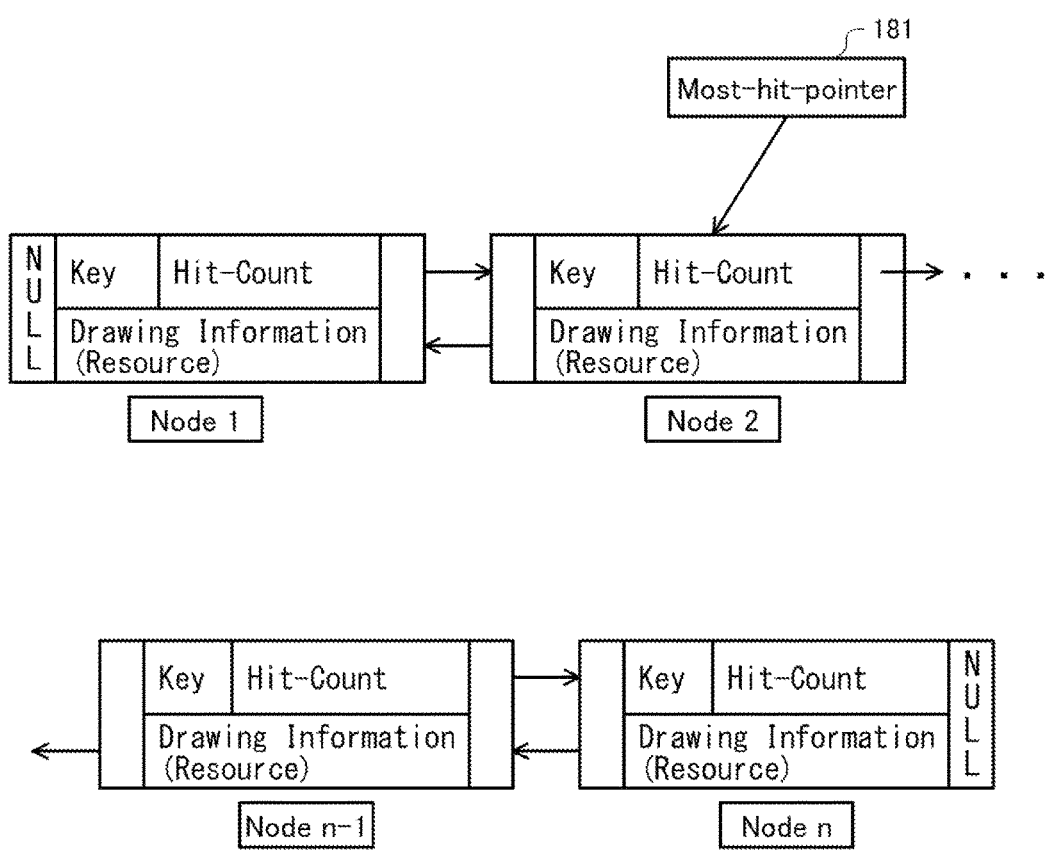
FIG. 9 illustrates a schematic drawing representing the resource searching process using the most-hit pointer in the bi-direction chain structure according to the one embodiment.

FIG. 8 illustrates a flow chart representing the resource searching process using a most-hit pointer 181 according to the one embodiment. FIG. 9 illustrates a schematic drawing representing the resource searching process using the most-hit pointer 181 in the bi-direction chain structure according to the one embodiment.

At Step S300, the XPS reading unit 121 executes the process using most-hit pointer 181. The most-hit pointer 181 points or labels the most-hit node holding the highest hit count or the largest count of the match. For example, if the second node has the highest hit count, the most-hit pointer 181 points the second node or Node 2 as shown in FIG. 9.

At Step S310, the XPS reading unit 121 compares the received coming key with the key pointed by the most-hit pointer 181. At Step S320, the XPS reading unit 121 determines whether the received coming key is the same as the key of the node, which is Node 2 in this example, pointed by the most-hit pointer 181. In other words, the XPS reading unit 121 determines whether the received key matches the key pointed by the most-hit pointer 181 or not.

If the received coming key is the same as the key of the node pointed by the most-hit pointer 181, the XPS reading unit 121 advances the process to Step S330. At Step S330, the XPS reading unit 121 increases the hit count of Node 2 by 1 for the most-hit node. At Step S340, the XPS reading unit 121 sets the output to a resource or drawing information.

If the received coming key is not the same as the key of the node pointed by the most-hit pointer 181, the XPS reading unit 121 advances the process to Step S350. At Step S350, the XPS reading unit 121 decreases the hit count of Node 2 by 1 for the most-hit node. This hit count decreasing rule gives more chances for recent hit nodes having higher hit counts to replace the old most-hit node.

Figure 10:
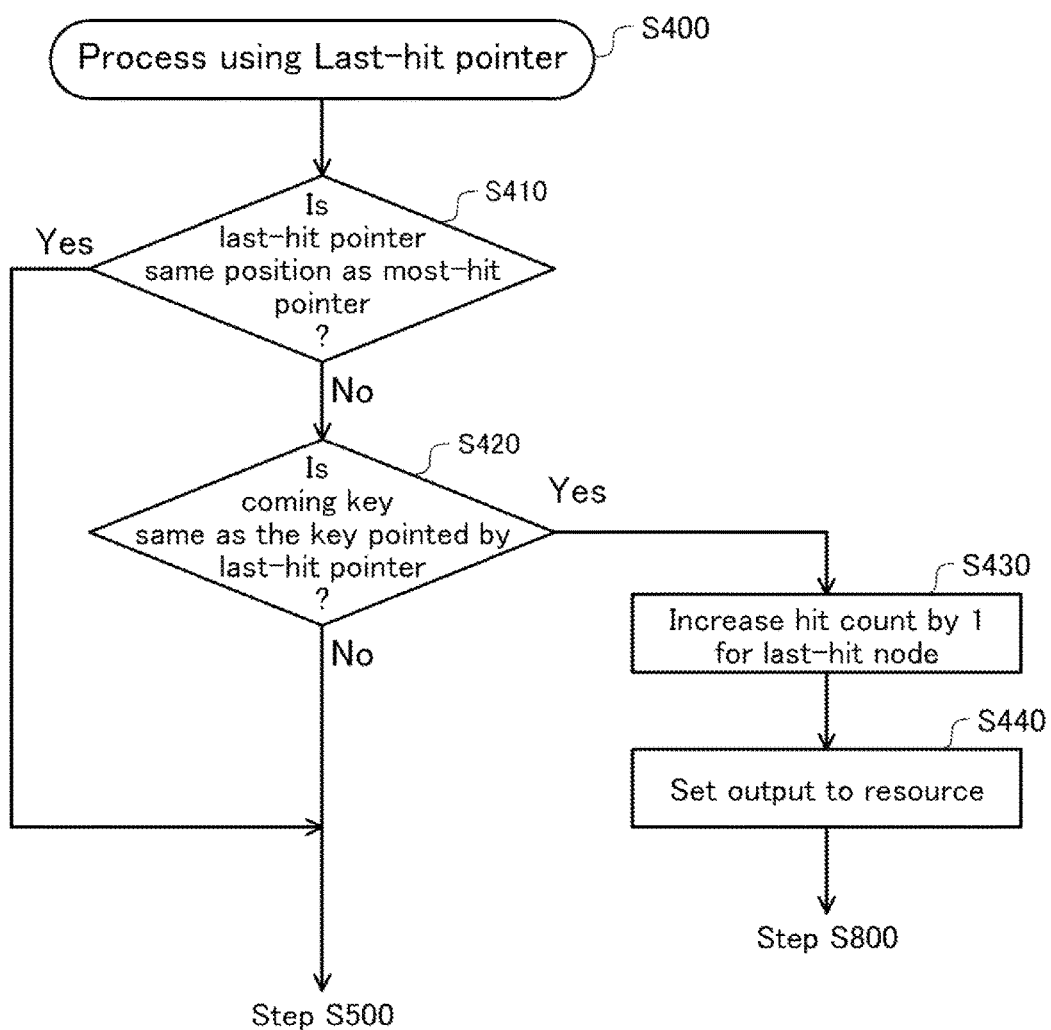
FIG. 10 illustrates a flow chart representing the resource searching process using a last-hit pointer 182 in the bi-direction chain structure according to the one embodiment.
Figure 11:
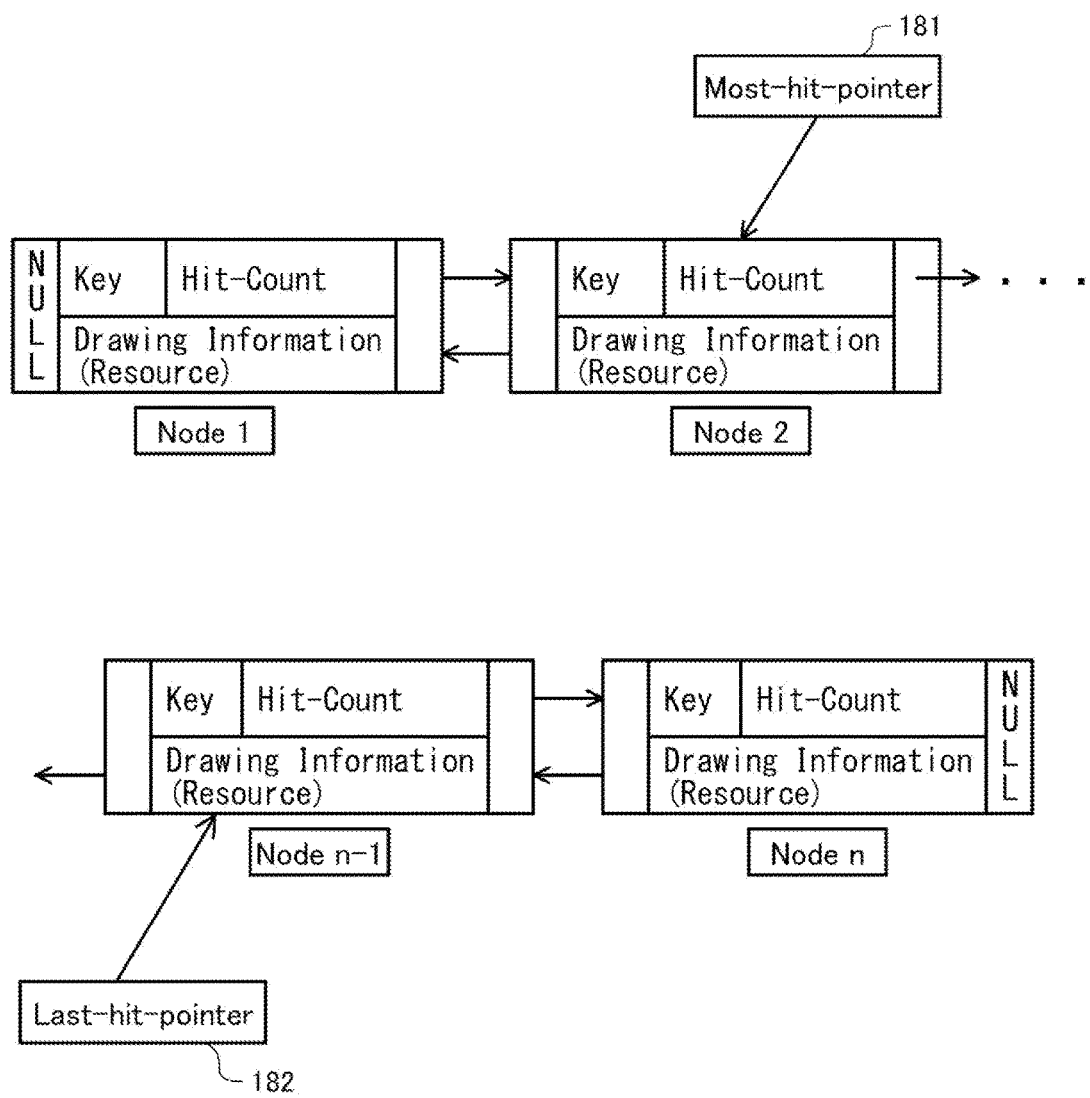
FIG. 11 illustrates a schematic drawing representing the resource searching process using the last-hit pointer 182 in the bi-direction chain structure according to the one embodiment.

FIG. 10 illustrates a flow chart representing the resource searching process using a last-hit pointer 182 in the bi-direction chain structure according to the one embodiment. FIG. 11 illustrates a schematic drawing representing the resource searching process using the last-hit pointer 182 in the bi-direction chain structure according to the one embodiment.

At Step S400, the XPS reading unit 121 executes the process using the last-hit pointer 182. The last-hit pointer 182 points or labels the last-hit node holding the last hit resource or the latest one of the match. For example, if the resource is found at Node n−1 in the last search, the last-hit pointer 182 points Node n−1 as shown in FIG. 11.

At Step S410, the XPS reading unit 121 determines whether the last-hit pointer 182 points the same position as the most-hit pointer 181 does. If the last-hit pointer 182 points the same position, the XPS reading unit 121 advances the process to Step S500. If the last-hit pointer 182 does not point the same position, the XPS reading unit 121 advances the process to Step S420. In this case, Node 2 is pointed by the most-hit pointer 181 while Node n−1 is pointed by the last-hit pointer 182. Thus, the XPS reading unit 121 advances the process to Step S420.

At Step S420, the XPS reading unit 121 determines whether the received key is the same as the key pointed by the last-hit pointer 182 or not. In other words, the XPS reading unit 121 determines whether the received key matches the key pointed by the last-hit pointer 182 or not. If the received key is the same as the key pointed by the last-hit pointer 182, the XPS reading unit 121 advances the process to Step S430. If the received key is not the same as the key pointed by the last-hit pointer 182, the XPS reading unit 121 advances the process to Step S500.

At Step S430, the XPS reading unit 121 increases the hit count of Node 2 by 1 for the last-hit node. At Step S440, the XPS reading unit 121 sets the output to a resource or drawing information.

Figure 12:
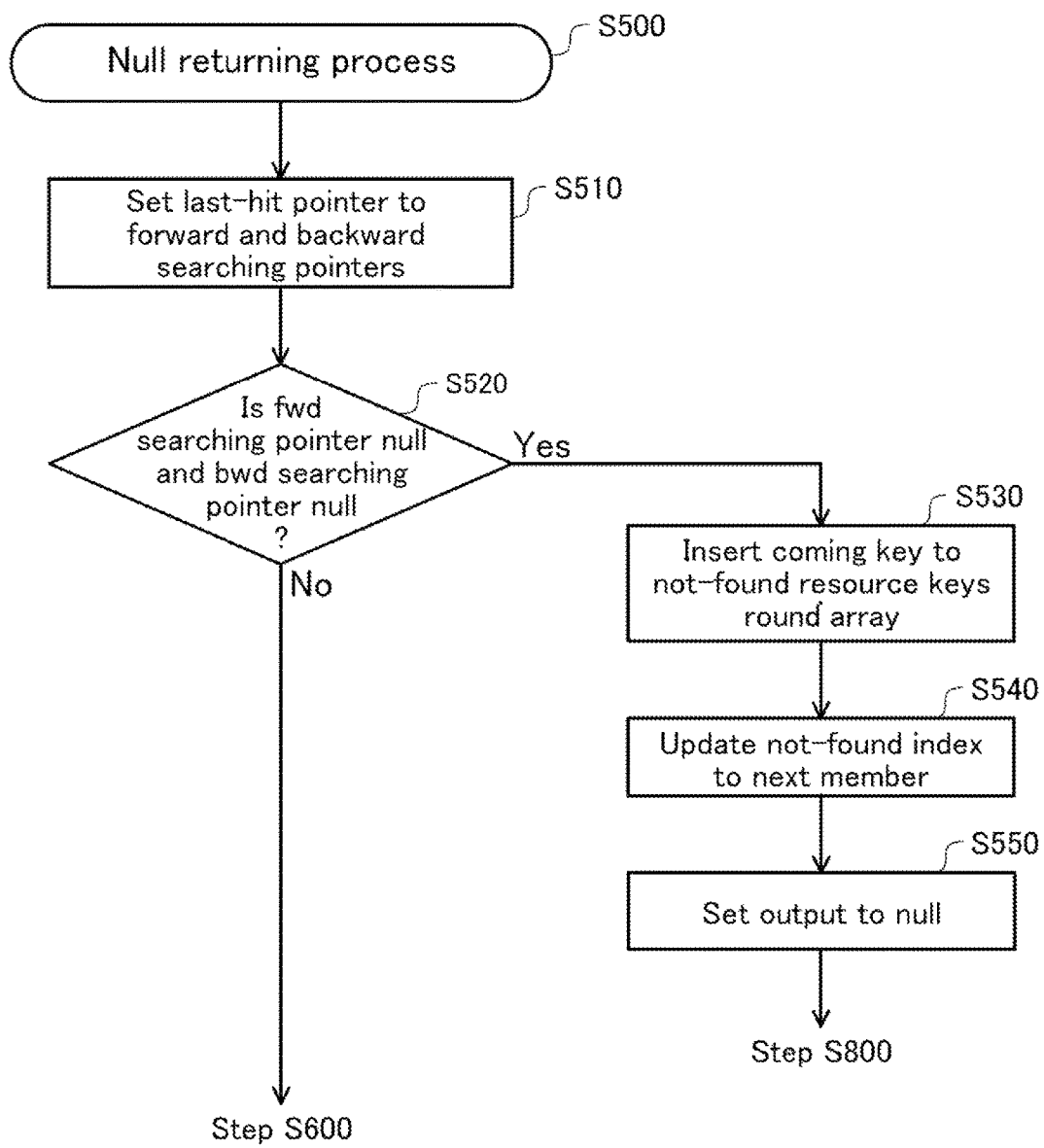
FIG. 12 illustrates a flow chart representing a null returning process of the resource searching process in the bi-direction chain structure according to the one embodiment.

FIG. 12 illustrates a flow chart representing a null returning process of the resource searching process in the bi-direction chain structure according to the one embodiment. At Step S500, the XPS reading unit 121 executes the null returning process. At Step S510, the XPS reading unit 121 sets the last-hit pointer 182 to point forward and backward searching pointers.

At Step S520, the XPS reading unit 121 determines whether the forward searching pointer is null and the backward searching pointer is null or not. If the forward searching pointer and the backward searching pointer are null, the XPS reading unit 121 advances the process to Step S530.

At Step S530, the XPS reading unit 121 inserts the received coming keyY into the current member 173 of the not-found resource keys array 170 as shown in State 3 of FIG. 7. At Step S540, the XPS reading unit 121 updates the index 171 to point the next member 172 from the current member 173. At Step S550, the XPS reading unit 121 sets the output to a resource or drawing information.

If one of the forward searching pointer and the backward searching pointer is not null, the XPS reading unit 121 advances the process to Step S600.

Figure 13:
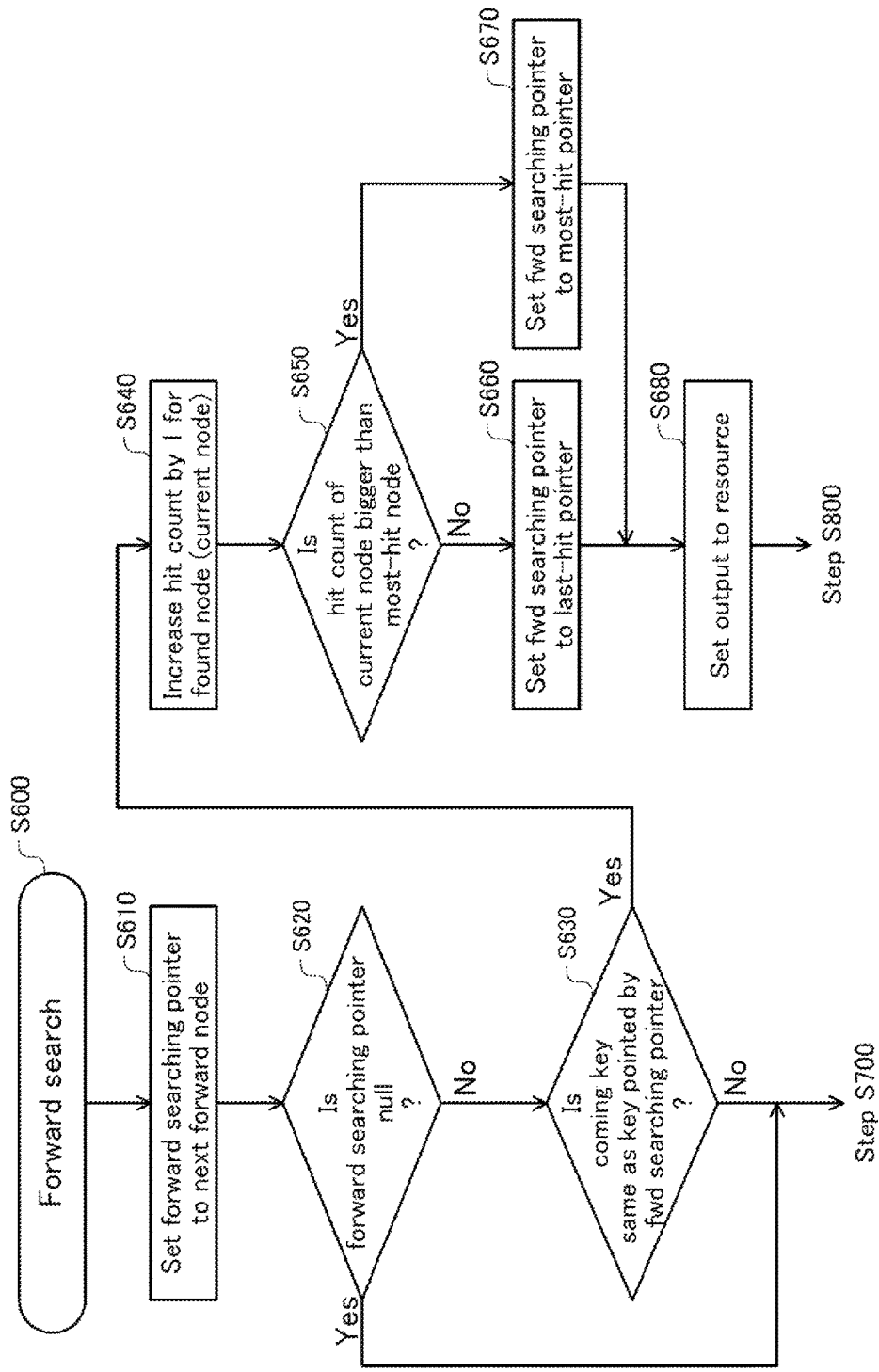
FIG. 13 illustrates a flow chart representing a forward search of the resource searching process in the bi-direction chain structure according to the one embodiment.

FIG. 13 illustrates a flow chart representing a forward search of the resource searching process in the bi-direction chain structure according to the one embodiment. At Step S600, the XPS reading unit 121 executes the forward search.

At Step S610, the XPS reading unit 121 sets the forward searching pointer to the next forward node. At Step S620, the XPS reading unit 121 determines whether the forward searching pointer is null or not. If the forward searching pointer is null, the XPS reading unit 121 advances the process to Step S700. If the forward searching pointer is not null, the XPS reading unit 121 advances the process to Step S630.

At Step S630, the XPS reading unit 121 determines whether the received coming key is the same as the key of the node pointed by the forward searching pointer. If the received coming key is the same as the key of the node pointed by the forward searching pointer, the XPS reading unit 121 advances the process to Step S640. If the received coming key is not the same as the key of the node pointed by the forward searching pointer, the XPS reading unit 121 advances the process to Step S700.

At Step S640, the XPS reading unit 121 increases the hit count by 1 for a found node (current node). At Step S650, the XPS reading unit 121 determines whether the hit count of the current node is bigger than the most-hit node or not. If the hit count of the current node is bigger than the most-hit node, the XPS reading unit 121 advances the process to Step S670. If the hit count of the current node is not bigger than the most-hit node, the XPS reading unit 121 advances the process to Step S660.

At Step S660, the XPS reading unit 121 sets the forward searching pointer to the last-hit pointer 182. At Step S670, the XPS reading unit 121 sets the forward searching pointer to the most-hit pointer 181. At Step S680, the XPS reading unit 121 sets the output to a resource or drawing information, and advances the process to Step S800.

For example, if the current node is Node n−1 at Step S520 (see FIG. 12), the XPS reading unit 121 sets the forward searching pointer to Node n at Step S610. At Step S620, the XPS reading unit 121 advances the process to Step S700 because Node n is the last node that returns null.

Figure 14:
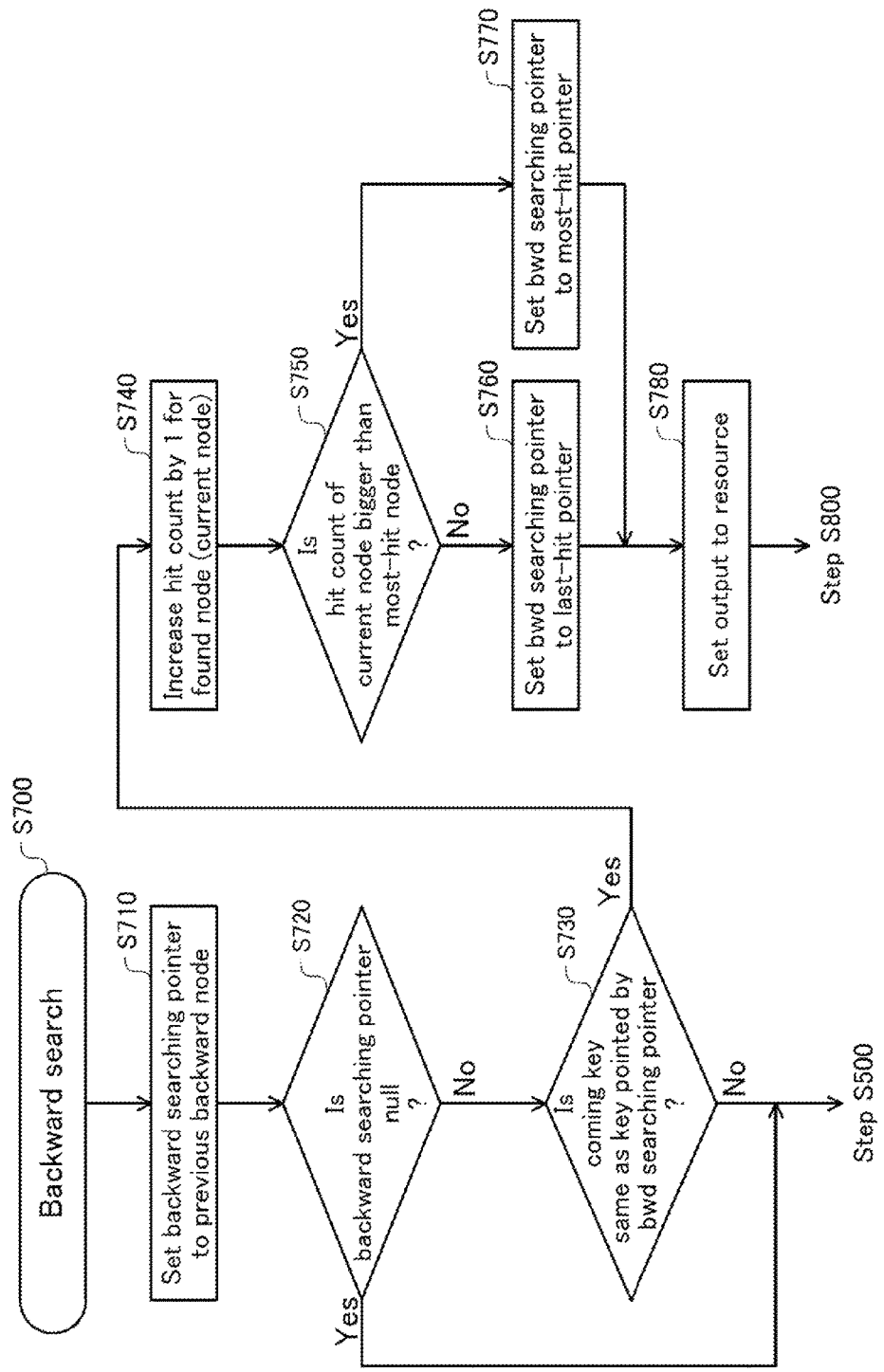
FIG. 14 illustrates a flow chart representing a backward search of the resource searching process in the bi-direction chain structure according to the one embodiment.

FIG. 14 illustrates a flow chart representing a backward search of the resource searching process in the bi-direction chain structure according to the one embodiment. At Step S700, the XPS reading unit 121 executes the backward search.

At Step S710, the XPS reading unit 121 sets the backward searching pointer to the previous backward node. At Step S720, the XPS reading unit 121 determines whether the backward searching pointer is null or not. If the backward searching pointer is null, the XPS reading unit 121 returns the process to Step S500. If the backward searching pointer is not null, the XPS reading unit 121 advances the process to Step S730.

At Step S730, the XPS reading unit 121 determines whether the received coming key is the same as the key of the node pointed by the backward searching pointer. If the received coming key is the same as the key of the node pointed by the backward searching pointer, the XPS reading unit 121 advances the process to Step S740. If the received coming key is not the same as the key of the node pointed by the backward searching pointer, the XPS reading unit 121 returns the process to Step S500.

At Step S740, the XPS reading unit 121 increases the hit count by 1 for a found node (current node). At Step S750, the XPS reading unit 121 determines whether the hit count of the current node is bigger than the most-hit node or not. If the hit count of the current node is bigger than the most-hit node, the XPS reading unit 121 advances the process to Step S770. If the hit count of the current node is not bigger than the most-hit node, the XPS reading unit 121 advances the process to Step S760.

At Step S760, the XPS reading unit 121 sets the backward searching pointer to the last-hit pointer 182. At Step S770, the XPS reading unit 121 sets the backward searching pointer to the most-hit pointer 181. At Step S780, the XPS reading unit 121 sets the output to a resource or drawing information and advances the process to Step S800.

At Step S800, the XPS reading unit 121 acquires the set output, which is the resource or null. If the XPS reading unit 121 acquires the resource, the XPS reading unit 121 renders the XPS job using the acquired resource. If the XPS reading unit 121 acquires null, the XPS reading unit 121 searches the received key in another resource dictionary specified by the resource searching order in the hierarchical structure of resource dictionaries in FIG. 2.

As described above, the image forming device 100 according to the one embodiment ensures the effective resource searching process in the bi-direction chain structure starting from the node pointed by the most-hit pointer 181 or the last-hit pointer 182. The image forming device 100 ensures the further effective resource searching process by starting the search from the most-hit pointer 181 or the last-hit pointer 182 having high probability of hit. The most-hit pointer and the last-hit pointer 182 are updated depending on the hit history, thus ensuring the yet further effective resource searching process.

Modifications

The disclosure will not be limited to respective embodiments described above, but modifications as follows are also possible.

Modification 1

While in the above-described embodiment the most-hit pointer 181 and the last-hit pointer 182 are employed, at least one of the most-hit pointer 181 or the last-hit pointer 182 is enough to point the starting node in the bi-direction chain structure.

Modification 2

While in the above-described embodiment XPS is employed as a page description language (PDL), any page description language may be employed insofar as the page description language allows the resource searching process using the bi-direction chain structure.

Modification 3

While in the above-described embodiment the not-found resource keys array is employed, the disclosure may be configured without the not-found resource keys array. However, use of the not-found resource keys array ensures the fast resource searching process especially in the case of using dictionary having a lot of resources.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. In a network-communications-enabled image forming device including a storage unit having a cache memory, and a page-description-language (PDL) reading unit, enabled for reading, in a PDL print job network-received from a computer, extensible markup language describing sheet layout and rendering commands, and for rendering the PDL print job into a printer raster-image processor scheme using, as rendering information, resources shared by the rendering commands, the resources being held in dictionaries either in a package in the PDL print job, or in the storage unit, a method of processing PDL resource dictionaries, comprising:

the PDL reading unit reading a data file in a predetermined page description language, the data file including a command configured to request, as requested resource data, resource data for reproducing pages in the PDL print job, the command including a search key;

the PDL reading unit chaining a plurality of pieces of resource data in each of a plurality of the PDL resource dictionaries;

loading the chained plurality of pieces of resource data in each of the plurality of resource dictionaries in the cache memory, the chained plurality of pieces of resource data each including a unique key;

the PDL reading unit searching the requested resource data from the chained pieces of resource data using the search key for matching the unique key of the requested resource data one by one along the chain in both directions from a starting piece of resource data;

labeling each of the plurality of pieces of resource data based on a history of the matching;

the PDL reading unit, using an array data structure, storing and managing a plurality of latest keys that were not found in previous resource dictionary searches if resource dictionary has more resources than a predefined threshold; and the PDL reading unit rendering the PDL print job into a printer raster-image processor scheme; wherein the PDL reading unit searching includes the PDL reading unit starting searches from the array if the array exists, in which the latest keys that were not found in previous resource dictionary searches are stored, and the PDL reading unit searching includes the PDL reading unit determining the starting piece of resource data in the chained plurality of pieces of resource data based on the history.

2. The method according to claim 1, wherein the history includes count of the matches for each key in the previous resource dictionary searches.

3. The method according to claim 1, wherein the history includes a key having the largest count of the matches in the previous resource dictionary searches.

4. The method according to claim 1, wherein the history includes non-matches prior to the searching, the non-matches labeling the resource dictionary as non-matching to the search key.

5. The method according to claim 1, wherein a key that was not found in current resource dictionary search is stored into an array data structure to replace the oldest key that was not found in previous search if the resource dictionary has more resources than a predefined threshold.

6. The method according to claim 1, wherein:
the page description language includes a hierarchy of at least one of page, document, and document sequence; and
the loading includes loading the plurality of resource dictionaries into the hierarchy in the memory area such that the resource dictionary in the page hierarchy is searchable from a corresponding page, the resource dictionary in the document hierarchy is searchable from a corresponding document, and the resource dictionary in the document-sequence hierarchy is searchable from a corresponding document sequence.

7. The method according to claim 1, wherein the predetermined page description language is XPS.

8. A network-communications-enabled image forming device, comprising:
a storage unit having a cache memory;
a page-description-language (PDL) reading unit, enabled for reading, in a PDL print job network-received from a computer, extensible markup language describing sheet layout and rendering commands, and for rendering the PDL print job into a printer raster-image processor scheme using, as rendering information, resources shared by the rendering commands, the resources being held in dictionaries either in a package in the PDL print job, or in the storage unit;
one or more processors; and a non-transitory data storage storing computer-readable instructions that, when executed by the one or more processors, cause the image forming device to perform functions comprising
the PDL reading unit reading a data file in a predetermined page description language, the data file including a command configured to request, as requested resource data, resource data for reproducing pages in the PDL print job, the command including a search key,
the PDL reading unit chaining a plurality of pieces of resource data in each of a plurality of the PDL resource dictionaries,
loading the chained plurality of pieces of resource data in each of the plurality of resource dictionaries in the cache memory, the chained plurality of pieces of resource data each including a unique key,
the PDL reading unit searching the requested resource data from the chained pieces of resource data using the search key for matching the unique key of the requested resource data one by one along the chain in both directions from a starting piece of resource data,
labeling each of the plurality of pieces of resource data based on a history of the matching, and
the PDL reading unit, using an array data structure, storing and managing a plurality of latest keys that were not found in previous resource dictionary searches if resource dictionary has more resources than a predefined threshold, and
the PDL reading unit rendering the PDL print job into a printer raster-image processor scheme, wherein
the PDL reading unit searching includes the PDL reading unit starting searches from the array if the array exists, in which the latest keys that were not found in previous resource dictionary searches are stored, and the PDL reading unit searching includes the PDL reading unit determining the starting piece of resource data in the chained plurality of pieces of resource data based on the history.

9. The image forming device according to claim 8, wherein the history includes count of the matches for each key in the previous resource dictionary searches.

10. The image forming device according to claim 8, wherein the history includes a key having the largest count of the matches in the previous resource dictionary searches.

11. The image forming device according to claim 8, wherein the history includes non-matches prior to the searching, the non-matches labeling the resource dictionary as non-matching to the search key.

12. The image forming device according to claim 8, wherein a key that was not found in current resource dictionary search is stored into an array data structure to replace the oldest key that was not found in previous search if the resource dictionary has more resources than a predefined threshold.

13. The image forming device according to claim 8, wherein:
the page description language includes a hierarchy of at least one of page, document, and document sequence; and
the loading includes loading the plurality of resource dictionaries into the hierarchy in the memory area such that the resource dictionary in the page hierarchy is searchable from a corresponding page, the resource dictionary in the document hierarchy is searchable from a corresponding document, and the resource dictionary in the document-sequence hierarchy is searchable from a corresponding document sequence.

14. The image forming device according to claim 8, wherein the predetermined page description language is XPS.

15. For a network-communications-enabled image forming device including a storage unit having a cache memory, a page-description-language (PDL) reading unit, enabled for reading, in a PDL print job network-received from a computer, extensible markup language describing sheet layout and rendering commands, and for rendering the PDL print job into a printer raster-image processor scheme using, as rendering information, resources shared by the rendering commands, the resources being held in dictionaries either in a package in the PDL print job, or in the storage unit, and one or more processors, a non-transitory computer-readable recording medium storing computer-readable instructions that, when executed by the one or more processors, cause in the image forming device:

the PDL reading unit to read a data file in a predetermined page description language, the data file including a command configured to request, as requested resource data, resource data for reproducing pages in the PDL print job, the command including a search key;

the PDL reading unit to chain a plurality of pieces of resource data in each of a plurality of the PDL resource dictionaries;

loading of the chained plurality of pieces of resource data in each of the plurality of resource dictionaries in the cache memory, the chained plurality of pieces of resource data each including a unique key;

the PDL reading unit to search the requested resource data from the chained pieces of resource data using the search key for matching the unique key of the requested resource data one by one along the chain in both directions from a starting piece of resource data;

labeling of each of the plurality of pieces of resource data based on a history of the matching;

the PDL reading unit, using an array data structure, to store and manage a plurality of latest keys that were not found in previous resource dictionary searches if resource dictionary has more resources than a predefined threshold; and the PDL reading unit to render the PDL print job into a printer raster-image processor scheme; wherein the PDL reading unit being caused to search includes the PDL reading unit starting searches from the array if the array exists, in which the latest keys that were not found in previous resource dictionary searches are stored, and the PDL reading unit being caused to search includes the PDL reading unit determining the starting piece of resource data in the chained plurality of pieces of resource data based on the history.

16. The non-transitory computer-readable recording medium according to claim 15, wherein the history includes count of the matches for each key in the previous resource dictionary searches.

17. The non-transitory computer-readable recording medium according to claim 15, wherein the history includes a key having the largest count of the matches in the previous resource dictionary searches.

18. The non-transitory computer-readable recording medium according to claim 15, wherein the history includes non-matches prior to the searching, the non-matches labeling the resource dictionary as non-matching to the search key.

19. The non-transitory computer-readable recording medium according to claim 15, wherein a key that was not found in current resource dictionary search is stored into an array data structure to replace the oldest key that was not found in previous search if the resource dictionary has more resources than a predefined threshold.

20. The non-transitory computer-readable recording medium according to claim 15, wherein:

the page description language includes a hierarchy of at least one of page, document, and document sequence; and the loading includes loading the plurality of resource dictionaries into the hierarchy in the memory area such that the resource dictionary in the page hierarchy is searchable from a corresponding page, the resource dictionary in the document hierarchy is searchable from a corresponding document, and the resource dictionary in the document-sequence hierarchy is searchable from a corresponding document sequence.

* * * * *